(12) United States Patent
Freed

(10) Patent No.: US 8,393,407 B2
(45) Date of Patent: Mar. 12, 2013

(54) CROP RESIDUE CLEARING DEVICE

(76) Inventor: Brian E. Freed, Lexington, IL (US)

( * ) Notice: Subject to any disclaimer, the term of this patent is extended or adjusted under 35 U.S.C. 154(b) by 247 days.

(21) Appl. No.: 12/758,648

(22) Filed: Apr. 12, 2010

(65) Prior Publication Data
US 2011/0247537 A1 Oct. 13, 2011

(51) Int. Cl.
A01B 49/04 (2006.01)
(52) U.S. Cl. ........................................ 172/551; 111/141
(58) Field of Classification Search ............... 111/18, 111/60, 140–142; 172/551
See application file for complete search history.

(56) References Cited

U.S. PATENT DOCUMENTS

| | | |
|---|---|---|
| 1,873,128 A | 8/1932 | Johnson |
| 3,244,237 A | 4/1966 | Keplinger et al. |
| 3,718,191 A | 2/1973 | Williams |
| 4,098,349 A | 7/1978 | Jilani |
| 4,099,576 A | 7/1978 | Jilani |
| 4,119,329 A | 10/1978 | Smith |
| 4,187,916 A | 2/1980 | Harden et al. |
| 4,295,532 A | 10/1981 | Williams et al. |
| 4,404,918 A | 9/1983 | Whalen et al. |
| 4,466,364 A | 8/1984 | Hassenfritz |
| 4,550,122 A | 10/1985 | David et al. |
| 4,594,951 A | 6/1986 | Grataloup |
| 4,607,705 A | 8/1986 | Tebben |
| 4,715,302 A | 12/1987 | Briggs |
| 4,723,495 A | 2/1988 | Dietrich, Sr. et al. |
| 4,775,013 A | 10/1988 | van der Lely |
| 4,815,544 A | 3/1989 | Good |
| 4,871,026 A | 10/1989 | Bernard |
| 4,947,770 A | 8/1990 | Johnston |
| 4,986,200 A | 1/1991 | Johnston |
| 5,076,180 A | 12/1991 | Schneider |
| 5,279,236 A | 1/1994 | Truax |
| 5,346,020 A | 9/1994 | Bassett |
| 5,394,946 A | 3/1995 | Clifton et al. |
| 5,413,056 A | 5/1995 | Freed et al. |
| 5,461,995 A | 10/1995 | Winterton |
| 5,477,792 A | 12/1995 | Bassett et al. |
| 5,497,716 A | 3/1996 | Shoup |
| 5,497,717 A | 3/1996 | Martin |
| 5,497,836 A | 3/1996 | Groff |
| 5,517,932 A | 5/1996 | Ott et al. |
| 5,640,914 A | 6/1997 | Rawson |
| 5,649,602 A | 7/1997 | Bruce |
| 5,657,707 A | 8/1997 | Dresher et al. |

(Continued)

OTHER PUBLICATIONS

Dawn Equipment Product Catalog 2008.

(Continued)

Primary Examiner — Christopher J. Novosad
(74) Attorney, Agent, or Firm — Jeffrey L. Thompson; Thompson & Thompson, P.A.

(57) ABSTRACT

Apparatus for clearing crop residue from a field is adapted for attachment to a tool bar of an agricultural implement or to a planter unit such that the apparatus is pulled through a field by the implement. The apparatus includes a support structure extending forward of the tool bar and at least one and preferably a pair of floating arms pivotally attached to a forward portion of the support structure and extending rearwardly, with a toothed wheel rotationally attached to an aft end of the arm(s). A coulter attached to the support structure is disposed between and extends forward of the soil-engaging toothed wheel(s) and in combination with the wheel(s) severs and removes residue in the seeding pathway. An adjustable biasing arrangement urges the toothed wheels, either in unison or independently, downwardly into engagement with the soil. Upper and lower stop limits are provided to limit vertical positioning of the toothed wheel(s).

78 Claims, 12 Drawing Sheets

U.S. PATENT DOCUMENTS

| | | | |
|---|---|---|---|
| 5,660,126 | A | 8/1997 | Freed et al. |
| 5,685,245 | A | 11/1997 | Bassett |
| 5,697,455 | A | 12/1997 | Deckler |
| 5,704,430 | A | 1/1998 | Smith et al. |
| 5,787,994 | A | 8/1998 | Friesen |
| 5,819,855 | A | 10/1998 | Tarver, III |
| 5,862,763 | A | 1/1999 | Dietrich, Sr. |
| 5,887,664 | A | 3/1999 | Whalen et al. |
| 5,967,455 | A | 10/1999 | Farber |
| 6,006,684 | A | 12/1999 | Whalen et al. |
| 6,009,955 | A | 1/2000 | Tarver, III |
| 6,253,692 | B1 | 7/2001 | Wendling et al. |
| 6,257,344 | B1 | 7/2001 | Tarver, III |
| 6,279,666 | B1 | 8/2001 | Nikkel et al. |
| 6,387,850 | B1 | 5/2002 | Freed |
| 6,425,445 | B1 | 7/2002 | Tarver, III |
| 6,575,104 | B2 | 6/2003 | Brummelhuis |
| 6,701,856 | B1 | 3/2004 | Zoske et al. |
| 6,761,120 | B2 | 7/2004 | Kovach et al. |
| 6,776,107 | B1 | 8/2004 | Shoup |
| 6,912,963 | B2 | 7/2005 | Bassett |
| 7,143,838 | B2 | 12/2006 | Piccat |
| 7,222,575 | B2 | 5/2007 | Bassett |
| 7,240,627 | B1 | 7/2007 | Whalen et al. |
| 7,360,495 | B1 | 4/2008 | Martin |
| 7,451,712 | B2 | 11/2008 | Bassett et al. |
| 7,481,171 | B2 | 1/2009 | Martin |
| 7,565,870 | B2 | 7/2009 | Martin |
| 7,594,546 | B2 | 9/2009 | Ankenman |
| D601,593 | S | 10/2009 | Martin |
| 7,644,670 | B2 | 1/2010 | Martin |
| 7,819,072 | B2 | 10/2010 | Martin |
| 7,832,345 | B2 | 11/2010 | Whalen et al. |
| 2007/0131153 | A1 | 6/2007 | Whalen et al. |
| 2007/0175644 | A1 | 8/2007 | Skolness |
| 2009/0025944 | A1 | 1/2009 | Bassett |
| 2009/0255452 | A1 | 10/2009 | Martin |
| 2009/0272552 | A1 | 11/2009 | Kaple |
| 2009/0301367 | A1 | 12/2009 | Martin |
| 2010/0000451 | A1 | 1/2010 | Martin et al. |
| 2010/0006309 | A1 | 1/2010 | Ankenman |

OTHER PUBLICATIONS

Dawn Equipment Pricelist 2009.
Dawn Equipment Products Gfx Row Cleaner Website 2009.
Dawn Equipment Products ZZ Planter Attachments Website 2009.
John Deere Planter Attachments and Enhancements 2008.
John Deere Frame-Mounted Coulter Sales Manual 2010.
AG Talk Forum John Deere 7000/Row Cleaner May 20, 2009.
John Deere Seeding Attachments and Enhancement Kits Manual 2008.
Great Plains Manufacturing, Inc. Terra-Tine Row Cleaner Manual p. 11.
Great Plains Manufacturing, Inc. Parts Manual 2009 pp. 101-102, 104-105, 108-109, and 128-129.
Groff AG LLC for All Planters for All Types of Tillage Practices Brochure 2010.
Kinze Manufacturing, Inc. Model 3660 Twin-Line Planter Operator & Parts Manual Jan. 2009 pp. 7-15.
Kinze Manufacturing, Inc. Vision for the Future 2008 Brochure page.
Martin Industries, LLC Martin Closing Systems Brochure 2009-2010 pp. 20 and 23.
Needham AG Technologies, LLC Product Sales Website pages 2009.
New Farm.org Proof Positive That Regenerative AG Can Out-Perform Conventional Practical Farmers of Iowa Network Nov. 25, 2002.
Schaffert Manufacturing & Sales Equipment Gallery Website pages 2009.
International Search Report and Written Opinion dated Apr. 6, 2011 for corresponding PCT Patent Application No. PCT/US2011/024927, 23 pgs.
Sunco Marketing Saber Tooth Brochure 2010.
Sunco Marketing New Torsion Spring with Pulled Residue Cleaning Wheels Brochure page and Pictures attached taken at Peoria Farm Show Dec. 1, 2009.
Shoup Manufacturing Company Shoupparts.com Catalog Planter Yetter Row Cleaner Parts Website 2010.
Yetter Manufacturing Company New Product Information Press Release Still the Toughest Residue Manager on the Market—the New 10"SharkTooth Wheel Apr. 10, 2007.
Yetter Manufacturing Company New Product Information Press Release Discover the Benefits of the SharkTooth Residue Manager Jul. 16, 2004.
Yetter Manufacturing Company 2967-037 Titan Residue Manager for John Deere Coulter Operator's Manual Part Identification Mar. 2009 p. 7.
Yetter Manufacturing Company Titan Series 2960 U.N.T. Coulter 2967-007 U.N.T. Residue Manager Operator's Manual May 2009.
Yetter Manufacturing Company New Product Information Press Release 2967 Series Frame Mounted Residue Manager 2009.
Yetter Manufacturing Company Instruction Sheet Revised Jun. 27, 2001.
Yetter Manufacturing Company Titan Series 2960 U.N.T. Coulter 2967-007 U.N.T. Residue Manager Operator's Manual Nov. 2009 p. 5.

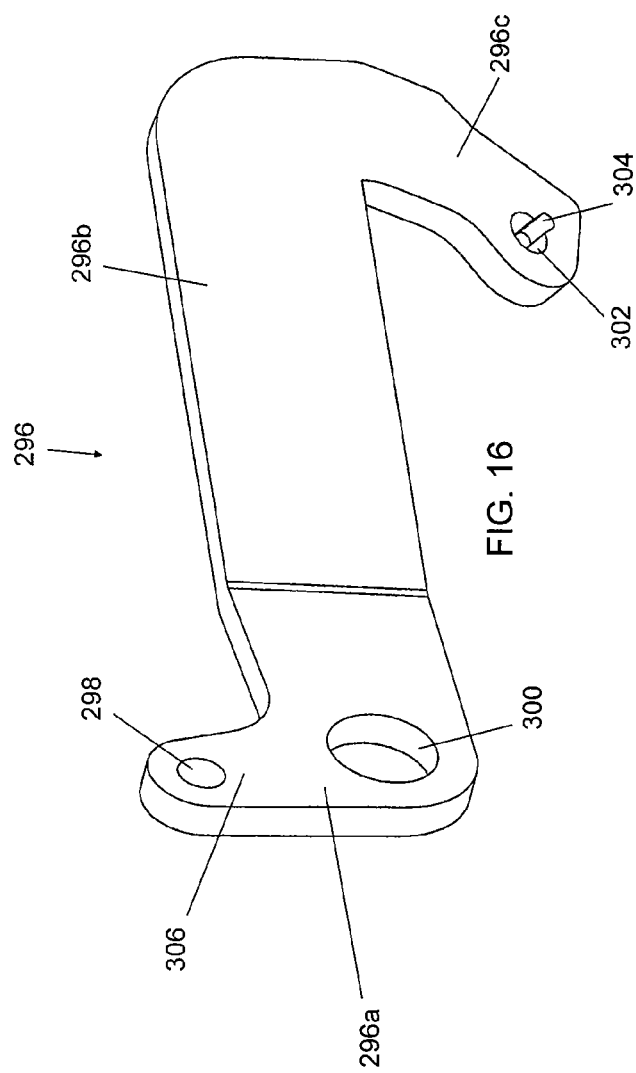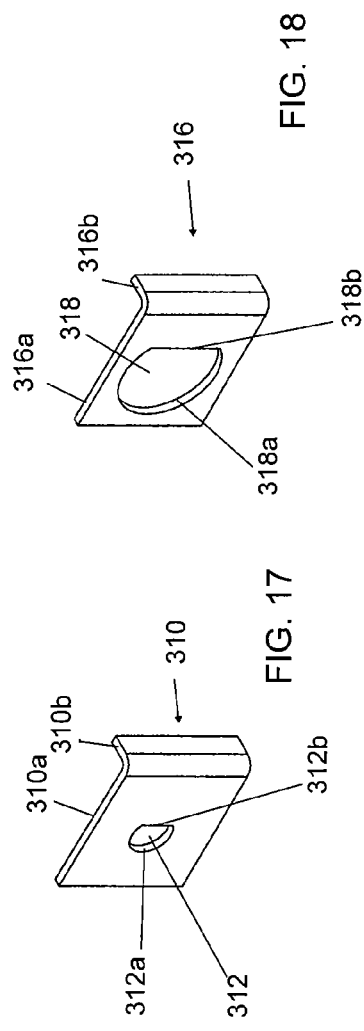

CROP RESIDUE CLEARING DEVICE

FIELD OF THE INVENTION

This invention relates generally to agricultural implements, and is particularly directed to apparatus for clearing crop residue from over the planting row with minimal soil disturbance.

BACKGROUND OF THE INVENTION

Agricultural practices over the last several decades have changed from complete, deep or broadcast tillage prior to planting to strip-till or direct (no-till) planting. Tillage passes provide relatively smooth, non-compacted and generally uniform soil and crop residue conditions to facilitate uniform seed depth and placement during planting. However, this approach is expensive, time consuming and results in increased erosion from both rain and wind and runs counter to current federal government restrictions requiring that a certain amount of ground cover remain in place at all times in fields. The more recent approach of direct planting results in reduced erosion and reduced costs in terms of fuel required to operate the field preparation and planting machinery. Planting in undisturbed soil and residue conditions is often less amenable to ensuring uniform seed depth and placement. However, the no-till or minimum till approach results in field and soil conditions which are less amenable to the planting of crops. For example, the field surface cover is typically non-uniform and the increased crop residue remaining in the no-till or minimum till fields is more likely to result in fouling of the planting implements and non-uniformity in the depth, spacing and alignment of the rows of planted seed. Crop debris clearing devices have been developed to address these planting problems.

Conventional crop debris clearing devices typically include one or more wheels, frequently having teeth on their outer periphery, in combination with coulters which engage the soil and reduce debris such as mulch and plant stalks to small pieces to facilitate mixing the crop debris with the soil and clearing the debris from the areas in which row crops such as corn are to be planted. The combination of these rotating wheels and coulters engage the soil to cut and plow residue out from in front of the planter during the planting operation. It is important to precisely control the depth and seed spacing of these soil-engaging implements so that they effectively reduce and remove the crop residue while optimizing plant emergence and growth and minimizing the disruption of the soil for economic and government regulation compliance purposes. In addition, the crop residue clearing device should be drawn through the field in a manner which allows it to quickly deflect upon impact with an obstruction in the field to avoid damage to or destruction of the device, while being urged downwardly with sufficient force to engage and reduce crop residue in the field. Moreover, each crop residue clearing device should be mounted to the agricultural implement so as not to interfere with the positioning and operation of the seed planting devices which are also mounted to the agricultural implement. Finally, the operating parameters of individual crop debris clearing devices should be adjustable to accommodate differences between the soil conditions associated with each row crop position. These and more features are provided in a row crop debris clearing device in accordance with the present invention.

OBJECTS AND SUMMARY OF THE INVENTION

Accordingly, it is an object of the present invention to provide a crop residue clearing device which is adjustable in soil depth operation, less susceptible to damage or destruction upon impact with obstructions in the soil, and allows for reduced soil penetration while providing for efficient crop debris reduction and removal from the planting area with minimum soil disturbance.

It is another object of the present invention to attach a crop residue clearing device to mounting hardware on an agricultural implement's tool bar without impacting the operation, positioning or attachment of planting implements on the tool bar.

Yet another object of the present invention is to provide for the accurate soil depth operation of a crop residue clearing device without using a complicated and expensive hydraulic, pneumatic or electric depth control arrangement.

A further object of the present invention is to provide a self-contained crop residue clearing device which is adjustable in soil operating depth, incorporates upper and lower limits of the soil engaging members, and applies a precise, pre-determined vertical biasing force on the soil engaging members.

A still further object of the present invention is to independently urge downwardly into engagement with the soil individual soil engaging, residue-reducing members in a crop residue clearing device.

The present invention contemplates an arrangement for clearing crop residue from a field traversed by an agricultural implement having a tool bar, the arrangement comprising a support structure having a first forward portion disposed in the direction of travel of the apparatus during operation and a second opposed aft portion; a first mounting structure attaching the second aft portion of the support structure to the tool bar of the agricultural implement; a crop residue clearing device engaging the soil; and a second mounting structure attaching said crop residue clearing device to the first forward portion of the support structure for pulling the crop residue clearing device through the field.

The present invention further contemplates apparatus for clearing crop residue from a field traversed by an agricultural implement, the apparatus comprising a housing, a coupling arrangement for attaching the housing to a structural member of the agricultural implement such that at least a forward portion of the housing extends forward of the structural member, a first crop residue clearing device, a first pivoting coupler attaching the first crop residue clearing device to the housing such that the first crop residue clearing device is pulled through a field by the agricultural implement and is adapted for vertical displacement in traversing irregularities in the field.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 16 is a perspective view of another embodiment of a pivoting arm for mounting a toothed wheel in the crop residue clearing device of the present invention;

FIG. 17 is a perspective view of a D-clip for attaching a toothed wheel to a pivoting arm such as that shown in FIG. 16 in accordance with another aspect of the present invention; and FIG. 18 is another embodiment of a D-clip for attaching a toothed wheel to a pivoting arm such as shown in FIG. 16.

DETAILED DESCRIPTION OF THE PREFERRED EMBODIMENTS

Figure 1:
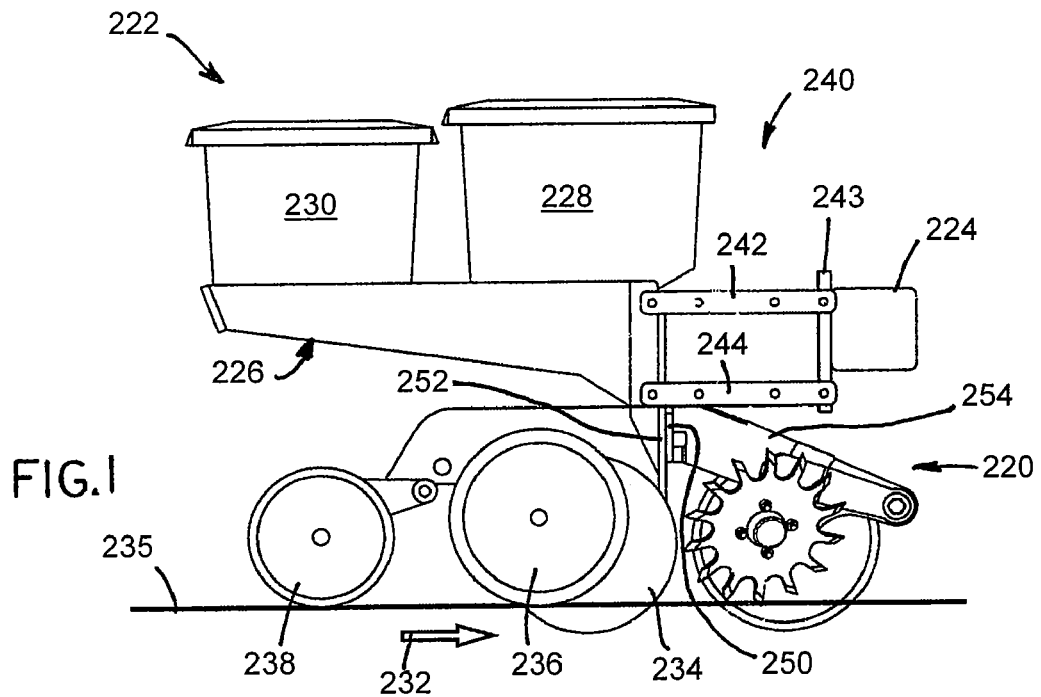
FIG. 1 is a side elevation view of the inventive crop residue clearing device mounted directly to a planter unit in accordance with one embodiment of the present invention.
Figure 2:
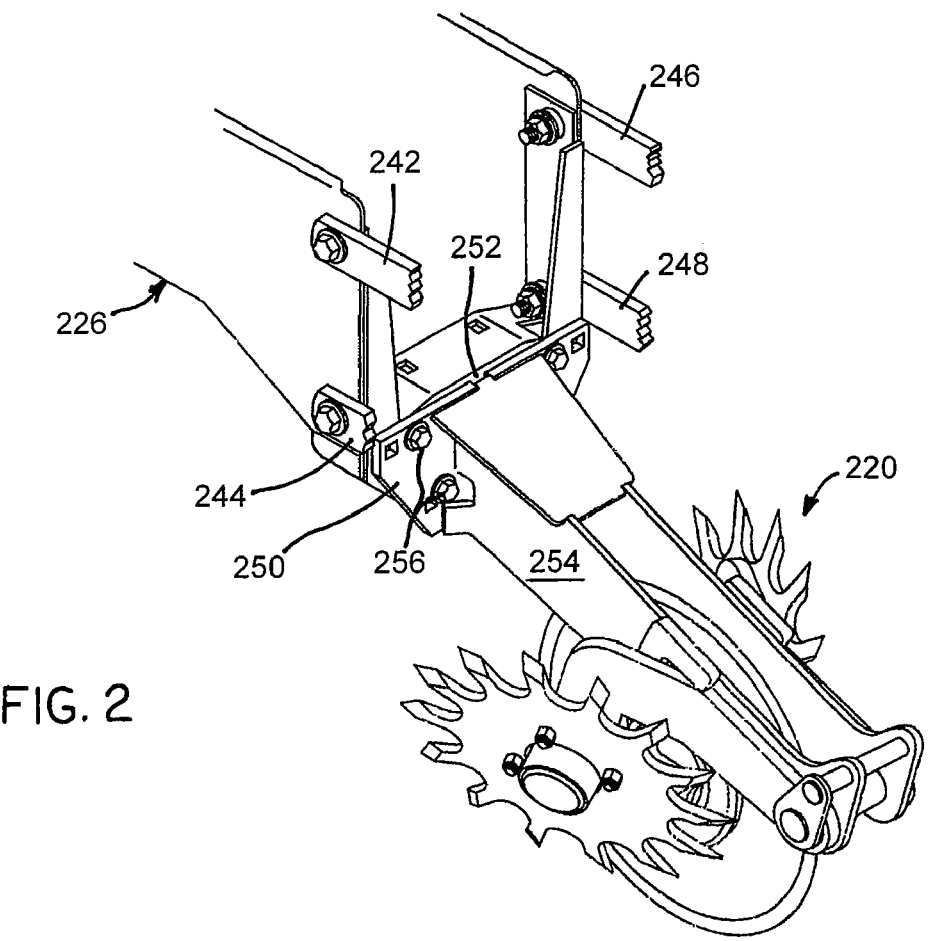
FIG. 2 is an upper perspective view of FIG. 1 illustrating additional details of the attachment of the inventive crop residue clearing device directly to a planter unit.

Referring to FIG. 1, there is shown a side elevation view of a conventional planter unit 222 to which is directly mounted the crop residue clearing device 220 in accordance with one embodiment of the present invention. FIG. 2 is an upper perspective view of the mounting arrangement for attaching the crop residue clearing device 220 to a forward portion of the planter unit 222. Planter unit 222 may include many elements, but for purposes of describing the present invention, the planter unit is shown as including a frame 226 to which are mounted a seed hopper 228, an insecticide hopper 230, and plural ground engaging members. The illustrated ground engaging members include a pair of laterally spaced furrow opening discs (where one disc is shown as element 234), plural gauge wheels (where one gauge wheel is shown as element 236), and a trailing furrow closing wheel 238. All of the aforementioned ground engaging members either ride on the surface of the soil 235, or penetrate the soil as part of the seed planting operation. The planter unit 222 is shown as traveling in the direction of arrow 232 during operation.

Attached to a forward portion of the planter unit's frame 226 is a pivoting parallel linkage arrangement 240 for facilitating mounting of the planter unit 222 to the tool bar 224 of an agricultural implement. Planter unit 222 is coupled to tool bar 224 by means of a flexible parallel linkage arrangement 240 and a mounting plate 243. Mounting plate 243 is secured to an aft surface of tool bar 224 by conventional couplers such as U-bolts (not shown in the figure for simplicity). The parallel linkage arrangement 240 includes first, second, third and fourth links 242, 244, 246 and 248 pivotally coupled at their respect aft ends to a forward portion of the planter unit's frame 226 and at their respective forward ends to mounting plate 243 to allow for vertical displacement between the tool bar 224 and the planter unit 222.

Attached to a forward portion of the planter unit's frame 226 by conventional means such as nut and bolt combinations or weldments is a planter mounting plate 252. As previously described, Applicant's crop residue clearing device 220 includes an aft mounting plate 250 which is adapted for secure coupling to a mounting plate such as planter mounting plate 252 by means of plural nut and bolt combinations 256. It is in this manner that the inventive crop residue clearing device 220 may be directly mounted to a forward portion of an individual planter unit 222 which affords increased flexibility in terms of the attachment and spacing of plural planter units to tool bar 224 as well as the mounting of additional devices used in row crop planting to the tool bar.

Figure 3:
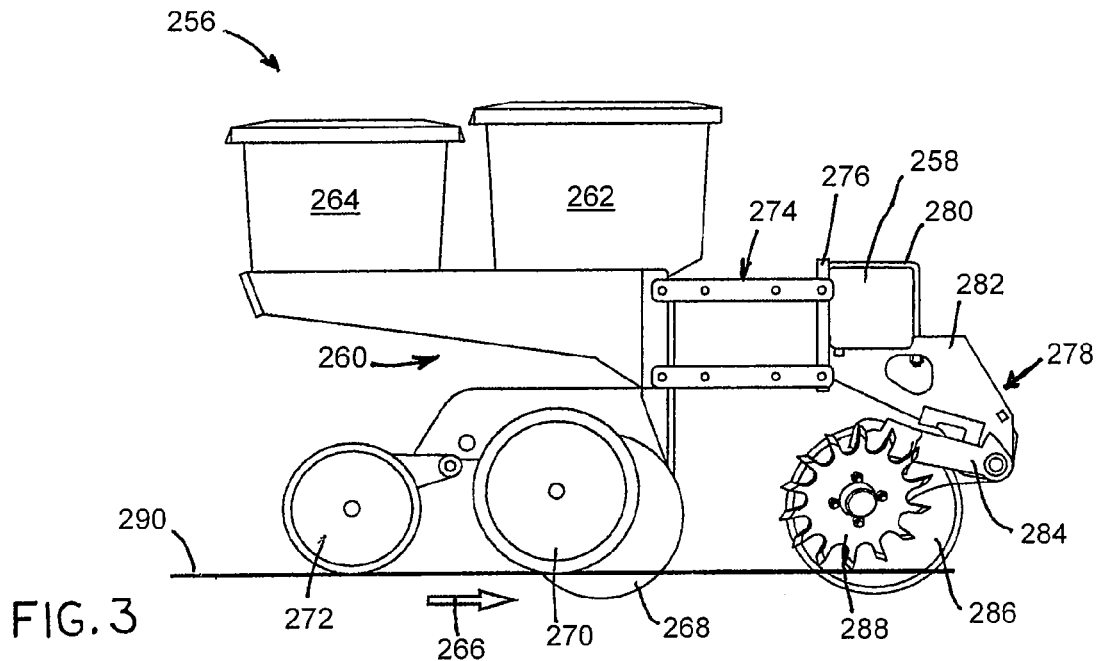
FIG. 3 is a side elevation view of a crop residue clearing device in accordance with another embodiment of the present invention attached to a tool bar and positioned forward of a planter unit.
Figure 4:
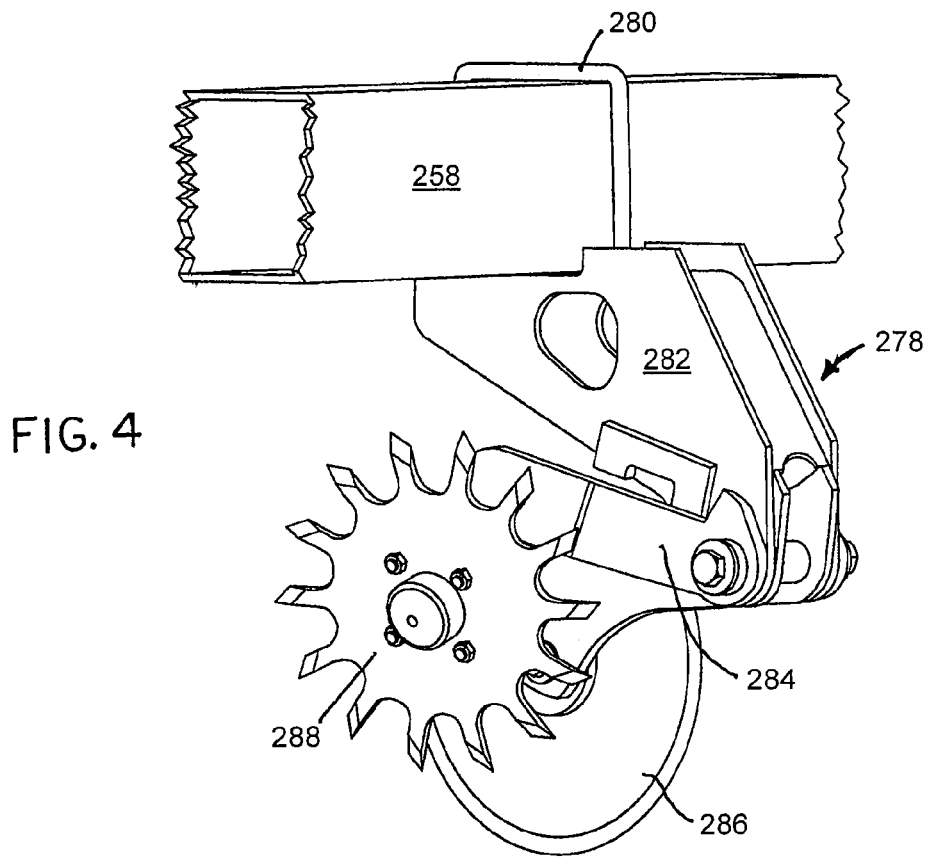
FIG. 4 is a front perspective view of the mounting arrangement of the crop residue clearing device to a tool bar shown in FIG. 3.

Referring to FIG. 3, there is shown a side elevation view of a crop residue clearing device 278 in accordance with another embodiment of the present invention shown attached to a tool bar 258 to which a trailing planter unit 256 is also attached. Planter unit 256 includes a frame 260 to which is typically attached a seed hopper 262 and an insecticide hopper 264. Typically attached to a lower portion of the planer frame 260 is the combination of one or more leading furrow opening discs 268 and one or more trailing furrow closing wheels 272. Also attached to a lower portion of the planter frame 260 is one or more gauge wheels 270 used in establishing the desired height of the planter unit 256 and its attachments relative to the surface of soil 290. Other components may be attached to planter unit 256, but are omitted from the drawing and are not discussed herein for simplicity. Planter unit 256 is attached to tool bar 258 by means of the combination of a parallel linkage arrangement 274 and a mounting plate 276. Planter unit 256 is drawn by the tool bar 258 in the direction of arrow 266. Also attached to tool bar 258 is the inventive crop residue clearing device 278. A perspective view of this mounting arrangement is shown in FIG. 4. This embodiment of the crop residue clearing device 278 includes a housing 282 having a forward portion to which is pivotally coupled a pair of pivoting arms 284 (only one of which is shown in the figures for simplicity). Attached to aft portions of each of the pivoting arms 284 is a respective toothed wheel 288. Also attached to housing 282 of the crop residue clearing device 278 by means of a pivoting arm is a coulter 286 disposed between two toothed wheels 288 and extending forward of these wheels. The crop residue clearing device 278 is aligned with the leading furrow opening discs 268 so as to clear the pathway over which the planting furrow is formed by the furrow opening disc(s) 268 of debris such as in the form of plant residue remaining on the soil from a prior crop harvesting.

Figure 5:
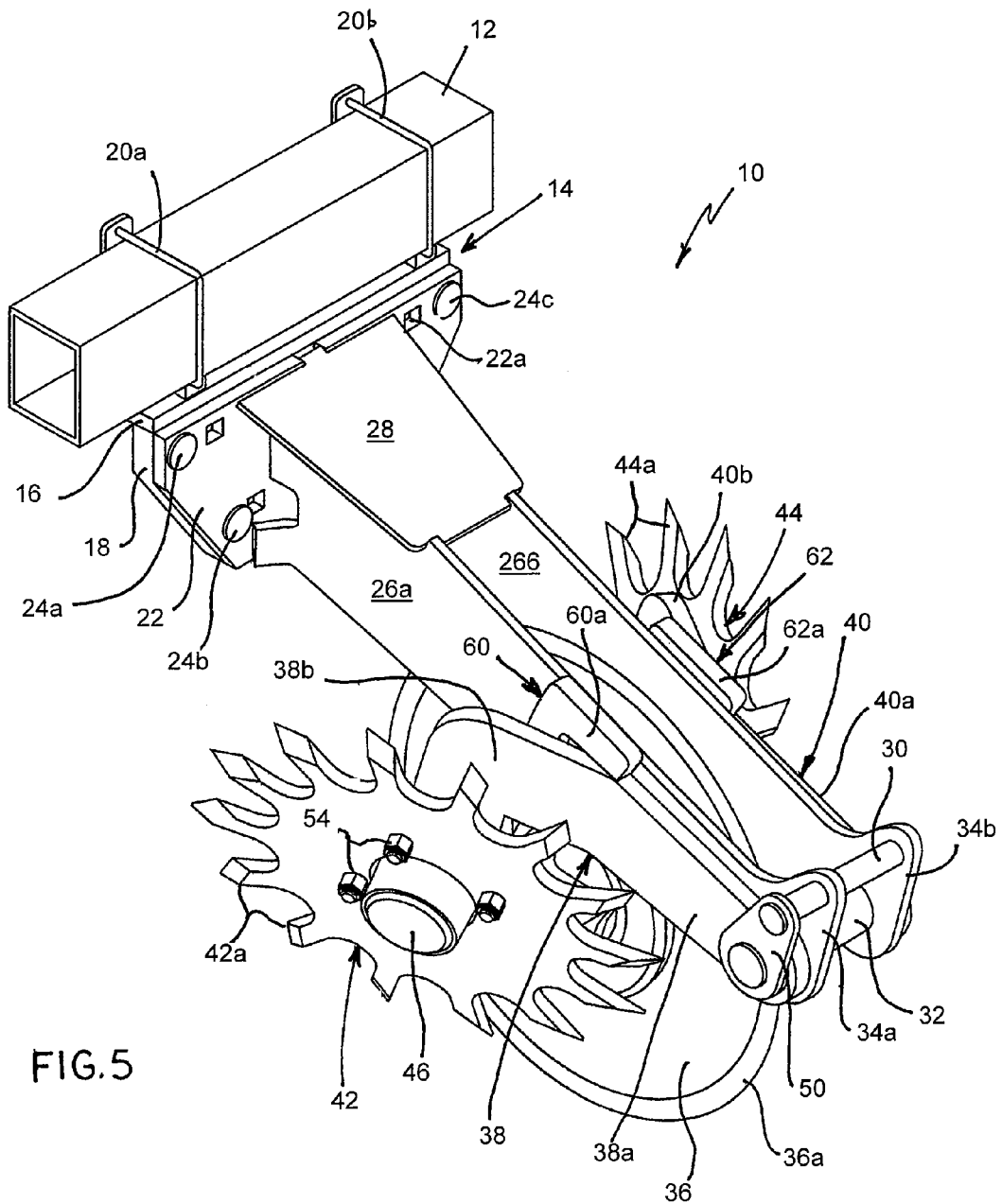
FIG. 5 is an upper perspective view of a crop debris clearing device in accordance with one embodiment of the present invention shown mounted to the tool bar of an agricultural implement.
Figure 7:
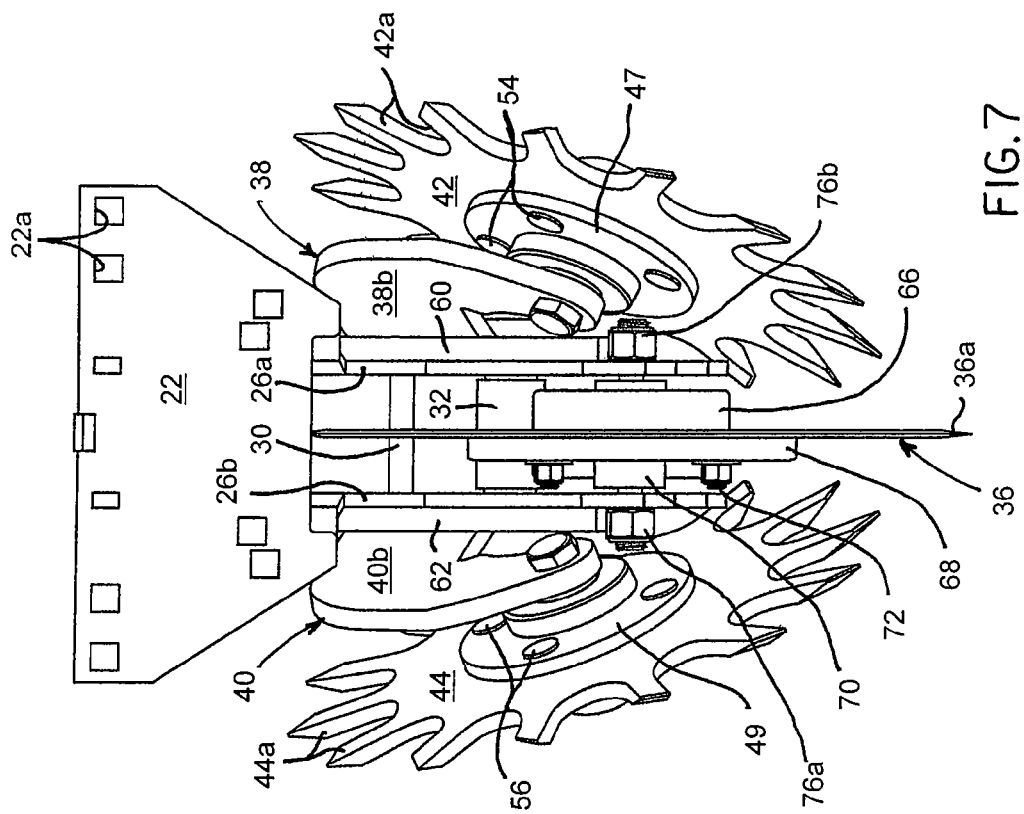
FIG. 7 is an aft plan view of the crop residue clearing device shown in FIG. 5.
Figure 6:
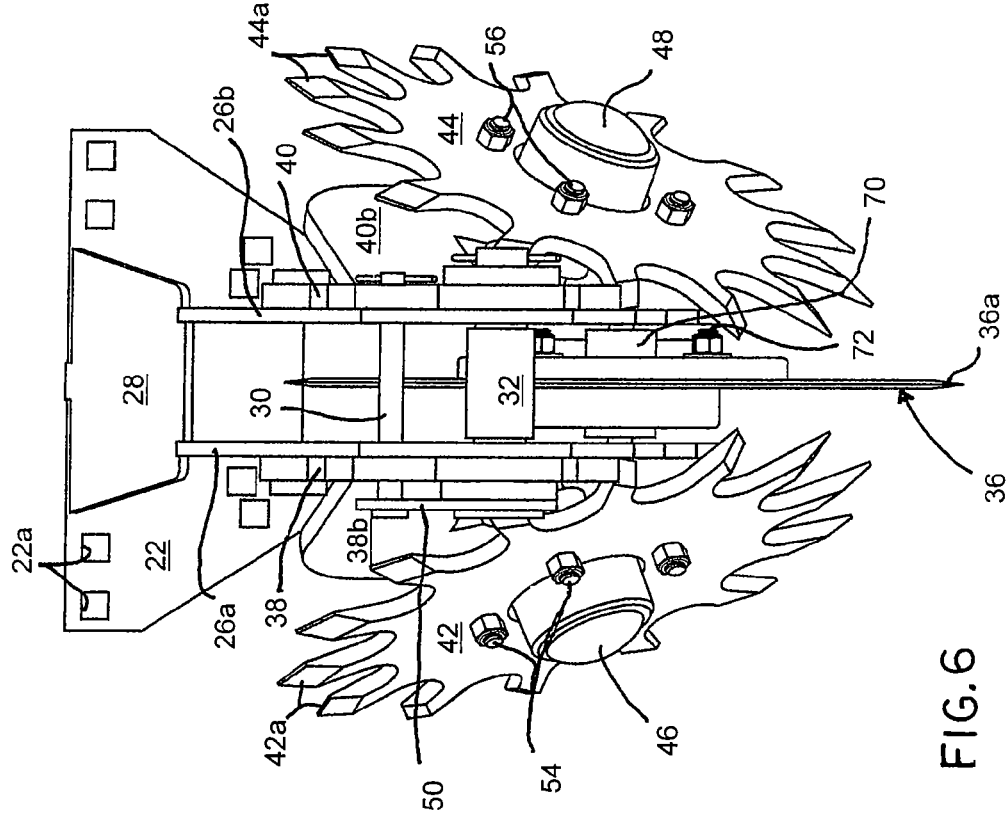
FIG. 6 is a front plan view of the crop residue clearing device shown in FIG. 5.
Figure 8:
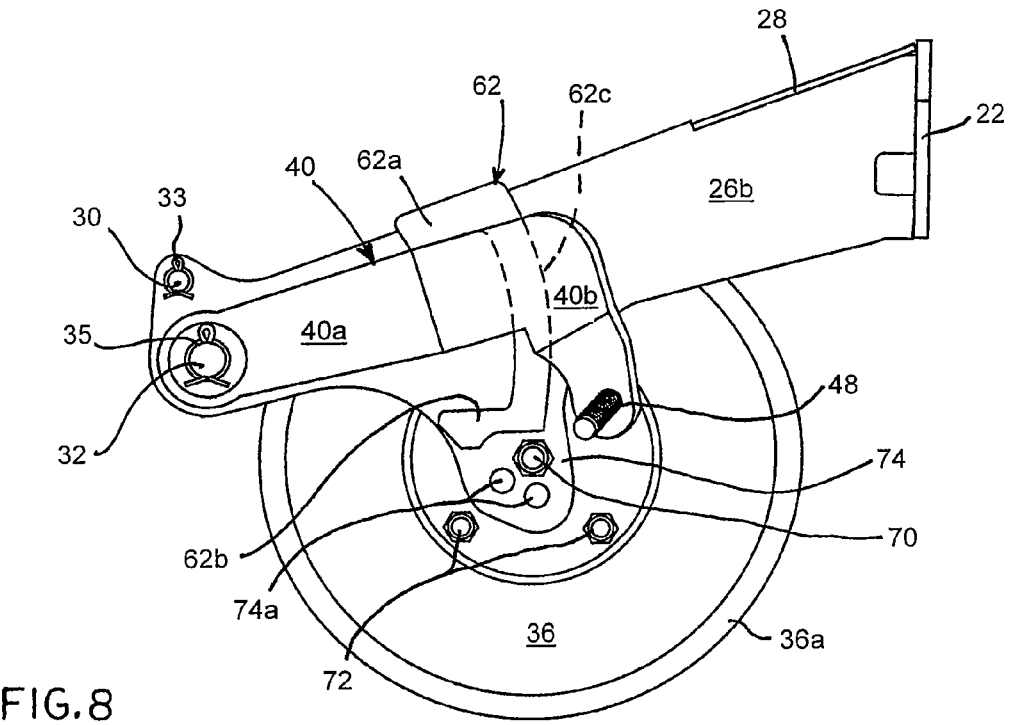
FIGS. 8 and 9 are side plan views of the crop residue clearing device of the present invention illustrating the configuration of the device with the soil engaging wheels in the full up and in the full down positions, respectively, where one of the soil engaging wheels has been removed for illustrative purposes.
Figure 9:
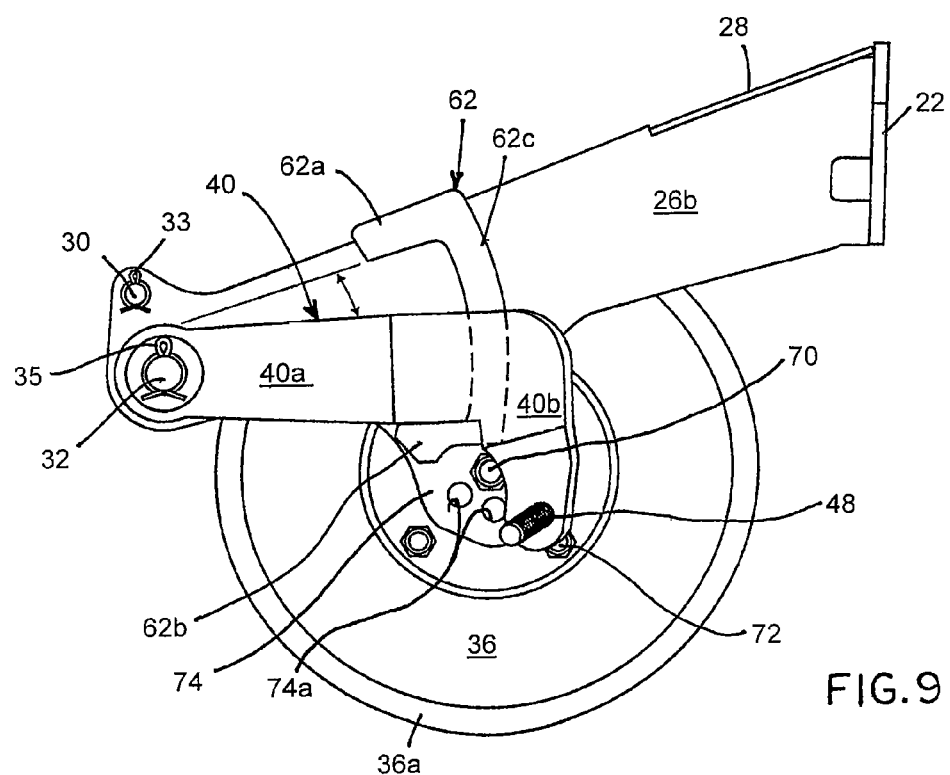

Referring to FIG. 5, there is shown an upper perspective view of a crop residue clearing device 10 in accordance with the principles of the present invention and as shown in FIGS. 1 and 2. With reference also to FIGS. 6 and 7, there are respectively shown front and aft plan views of the inventive crop residue clearing device 10 shown in FIG. 5. With reference further to FIGS. 8 and 9, there are shown lateral plan views of the embodiment of the crop residue clearing device 10 of the present invention with one of its ground engaging wheels removed for illustrative purposes, where a pivoting arm connected to one of these wheels is shown in the full up position and in the full down position, respectively.

The crop residue clearing device 10 is shown mounted to the tool bar 12 of an agricultural implement (with the remaining portion of the agricultural implement not shown for simplicity). Attached to the tool bar 12 by means of first and second U-bolts 20a and 20b is the combination of a first horizontal plate 16 and second vertical plate 18. The first horizontal plate 16 and the second vertical plate 18 are securely connected together by conventional means such as a weldment and are attached to a lower portion of the tool bar 12 and extend downwardly therefrom. The combination of the first horizontal plate 16 and the second vertical plate 18 allow for various agricultural implements to be securely attached to tool bar 12.

Attached to a forward surface of the second vertical plate 18 is a mounting plate 22 having plural spaced apertures 22a therein. Plural nut and bolt combinations 24a-24c permit secure mounting of mounting plate 22 to the forward surface of the second vertical plate 18. A fourth nut and bolt combination is also typically included in this mounting arrangement, although it is not shown in FIG. 5 for simplicity.

Attached to the front surface of mounting plate 22 by means of weldments is the crop residue clearing device 10 of the present invention. Crop residue clearing device 10 includes a forward extending support structure comprised of first and second support arms 26a, 26b and an upper plate 28 securely attached to the aforementioned support arms and to mounting plate 22 by means of weldments. Each of the first and second support arms 26a, 26b includes a respective aft end secured to mounting plate 22 and a respective forward end. First and second support arms 26a, 26b are arranged in a laterally spaced manner and include respective first and second upper flanges 34a and 34b disposed on the forward ends of the support arms. First and second support arms 26a, 26b extended forwardly of the tool bar 12 in the direction of travel of the agricultural implement during use in a field. First and second support arms 26a, 26b are thus pushed by the agricultural implement while in use.

Respective forward ends of the first and second support arms 26a, 26b are connected together by means of a first upper coupling bolt 30 and a second lower coupling bolt 31 which is inserted through an outer sleeve 32 and is welded to a flat plate 50. The first upper coupling bolt 30 and the second lower coupling bolt 32 are inserted through respective aligned pairs of apertures in the first and second support arms 26a, 26b and are securely maintained in position by means of first and second cotter pins 33 and 35 respectively inserted therethrough as shown in FIGS. 8 and 9. Attached to respective adjacent ends of the first upper coupling bolt 30 and the second lower coupling bolt 32 is the aforementioned flat plate 50 which includes a pair of apertures, each adapted to receive an end of either the first upper or second lower coupling bolt.

Attached in a pivoting manner to the forward end portions of the first and second support arms 26a and 26b by means of the second lower coupling pin 32 are the first and second pivoting arms 38 and 40. The first and second pivoting arms 38, 40 extend rearwardly from the forward end portions of the first and second support arms 26a, 26b. The first pivoting arm 38 includes a forward straight portion 38a and an aft outwardly angled portion 38b. Similarly, the second pivoting arm 40 includes a forward straight portion 40a and an aft outwardly angled portion 40b. The first and second pivoting arms 38, 40 are adapted to move vertically in a rotational manner about an axis defined by the second lower coupling pin 32. A lower portion of each of the aft angled portions 38b, 40b of the first and second pivoting arms 38, 40 is provided with a respective aperture (not shown for simplicity) for receiving first and second axles 46 and 48 for securely mounting first and second clearing wheels 42 and 44 to the first and second pivoting arms, respectively. The first clearing wheel 42 is further coupled to an aft, lower end portion of the first pivoting arm 38 by means of the combination of a first inner hub 47 and first mounting nut and bolt combinations 54. Similarly, the second clearing wheel 44 is securely mounted to a lower, aft portion of the second pivoting arm 40 by means of a second axle 48 as well as the combination of a second inner hub 49 and plural second nut and bolt combinations 56. Each of the first and second clearing wheels 42, 44 is freely rotatable relative to its associated pivoting arm and includes respective plural beveled teeth 42a and 44a about its outer periphery. As the crop residue clearing device 10 moves through a field, the first and second clearing wheels 42, 44 are rotationally displaced and move up and down with variations in the field contour by virtue of the first and second pivoting arms 38, 40 to which they are respectively mounted. The first and second clearing wheels 42, 44 move cut crop residue outwardly from the path covered by a coulter 36 (discussed below) along which seeds are to be planted.

Attached to respective outer portions of the first and second support arms 26a, 26b such as by weldments are first and second motion limiters 60 and 62. Each of the motion limiters if generally C-shaped. Thus, the second motion limiter 62 includes upper and lower limit portions 62a and 62b and an intermediate portion 62c extending between the upper and lower limit portions as shown in FIGS. 8 and 9. Similarly, the first motion limiter 60 includes upper and lower limit portions and an intermediate portion disposed therebetween, with only the upper limit portion 60a shown in the figures for simplicity. The first and second motion limiters 60, 62 respectively limit the upper and lower positioning limits of the first and second pivoting arms 38, 40, respectively, as they traverse a field. The lower portions of the first and second motion limiters 60, 62 also provide support and fixed positioning for the first and second clearing wheels 42, 44 during transport of the agricultural implement.

Attached to adjacent lower portions of the first and second support arms 26a, 26b by means of the combination of a third hub 66, a spacer 68 and a third axle 70 is the aforementioned coulter 36. With the third axle 70 inserted through aligned apertures (not shown) in respective lower portions of the first and second support arms 26a, 26b, the third axle is securely maintained in position on the support arms by means of coupling nuts 76a and 76b attached to opposed ends of the third axle. The coulter's peripheral edge 36a is sharply tapered to facilitate soil penetration and the cutting and reduction of crop residue and the coulter is freely rotatable.

As show in FIGS. 8 and 9, the lower portion 74 of the second support arm 26b includes plural spaced apertures 74a. The corresponding lower portion of the first support arm 26a has similarly positioned apertures. With the pair of aligned apertures in the respective lower portions of the first and second support arms 26a, 26b through which the third axle 70 is inserted, as well as the additional apertures 74a, the position of the cutting coulter 36 in the crop residue clearing device 10 of the present invention may be changed, or adjusted, vertically and/or horizontally to accommodate various soil conditions and planting criteria.

Figure 10:
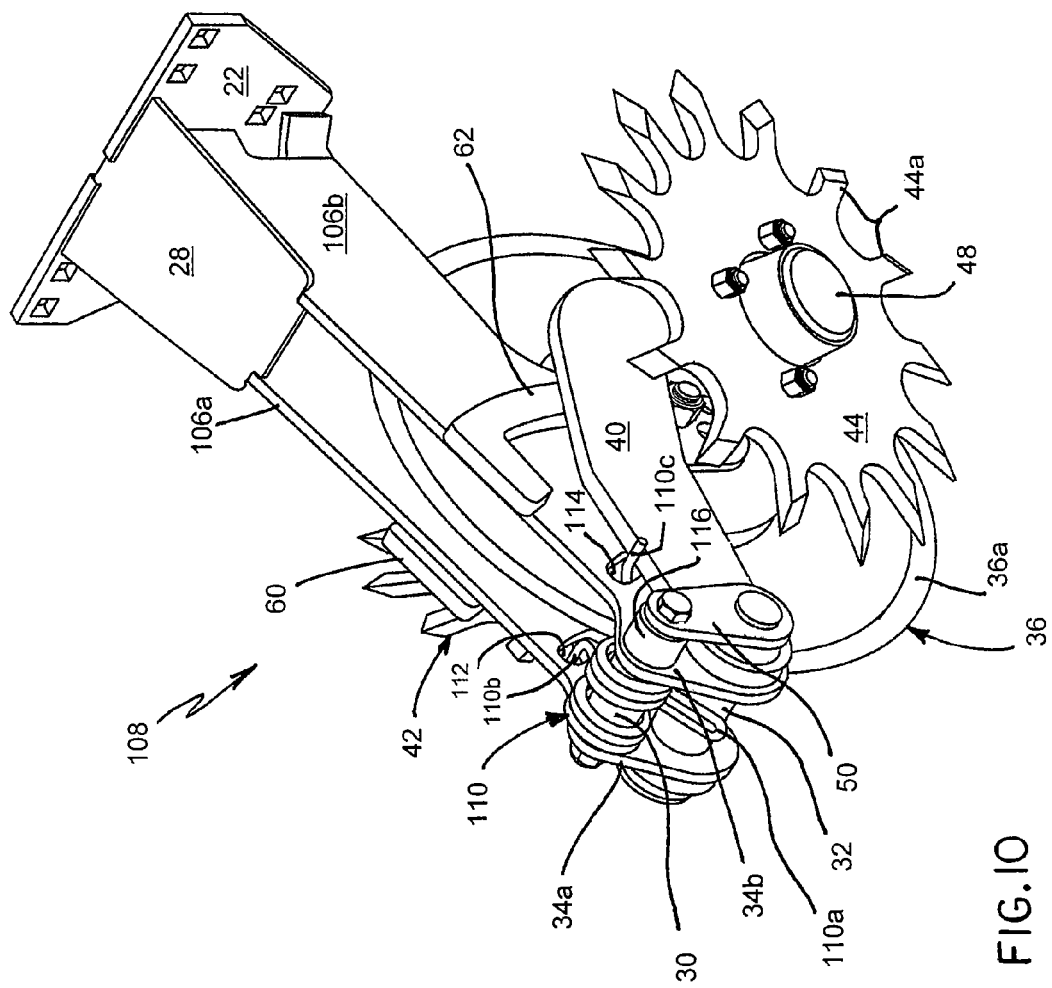
FIG. 10 is an upper perspective view of another embodiment of a crop residue clearing device in accordance with the principles of the present invention which includes an arrangement for exerting a downward or upward biasing force on the soil engaging members.

Referring the FIG. 10, there is shown another embodiment of a crop residue clearing device 108 in accordance with the principles of the present invention. Elements of the crop residue clearing device 108 shown in FIG. 10 which have the same configuration as, and perform the same function as, corresponding elements in the embodiment shown in FIGS. 5-9, are given the same element number. Similarly, common elements in additional embodiments of the present invention illustrated in FIGS. 11 and 12, which are described in detail below, are given the same identifying numbers as used in the description of the embodiments of the invention shown in FIGS. 5-10. Differences in components between the embodiments shown in FIGS. 10, 11 and 12 and the embodiment shown in FIGS. 5-9 are described below and give rise to different identifying numbers for those different elements.

The crop residue clearing device shown in FIG. 10 includes a torsion spring 110 disposed about first upper coupling pin 30 which is inserted through and connects the respective first and second upper flanges 34a, 34b of the first and second support arms 26a, 26b. The first upper coupling pin 30 is further inserted through an aperture in first flat bushing 50, with a cylindrical spacer 116 disposed between the flat bushing and the second upper flange 34b of the second support arm 26b.

Torsion spring 110 disposed about the first upper coupling pin 30 includes a first end 110a and adjacent second and third ends 110b and 110c. The first end 110a of the torsion spring 110 engages the second lower coupling pin 32. The second and third ends 110b, 110c of torsion spring 110 are inserted through apertures 112 and 114 respectively disposed in the first support arm 26a and the second support arm 26b. Each of the first and second apertures 112, 114 respectively disposed in the first and second support arms 26a, 26b is generally elongated allowing the second and third ends 110b and 110c of the torsion spring 110 to move up and down in a generally vertical direction. The second end 110b of torsion spring 110 is in contact with an upper edge of the first pivoting arm 38 to which the first clearing wheel 42 is rotationally attached. Similarly, the third end 110c of torsion spring 110 engages an upper edge portion of the second pivoting arm 40 to which the second clearing wheel 44 is rotationally attached. In this manner, torsion spring 110 exerts a downwardly directed force on the first and second pivoting arms 38, 40 so as to increase the extent of engagement of the clearing wheels with the soil and their operating depth in the soil. Similarly, by reversing the orientation of torsion spring 110 on the first upper coupling pin 30 and placing its third and fourth ends 110b, 110c on respective lower portions of the first and second pivoting arms 38, 40, the torsion spring will exert an upward force on the first and second pivoting arms 38, 40 so as to reduce the extent of engagement with, and the operating depth in, the soil of the first and second clearing wheels 42, 44.

Figure 11:
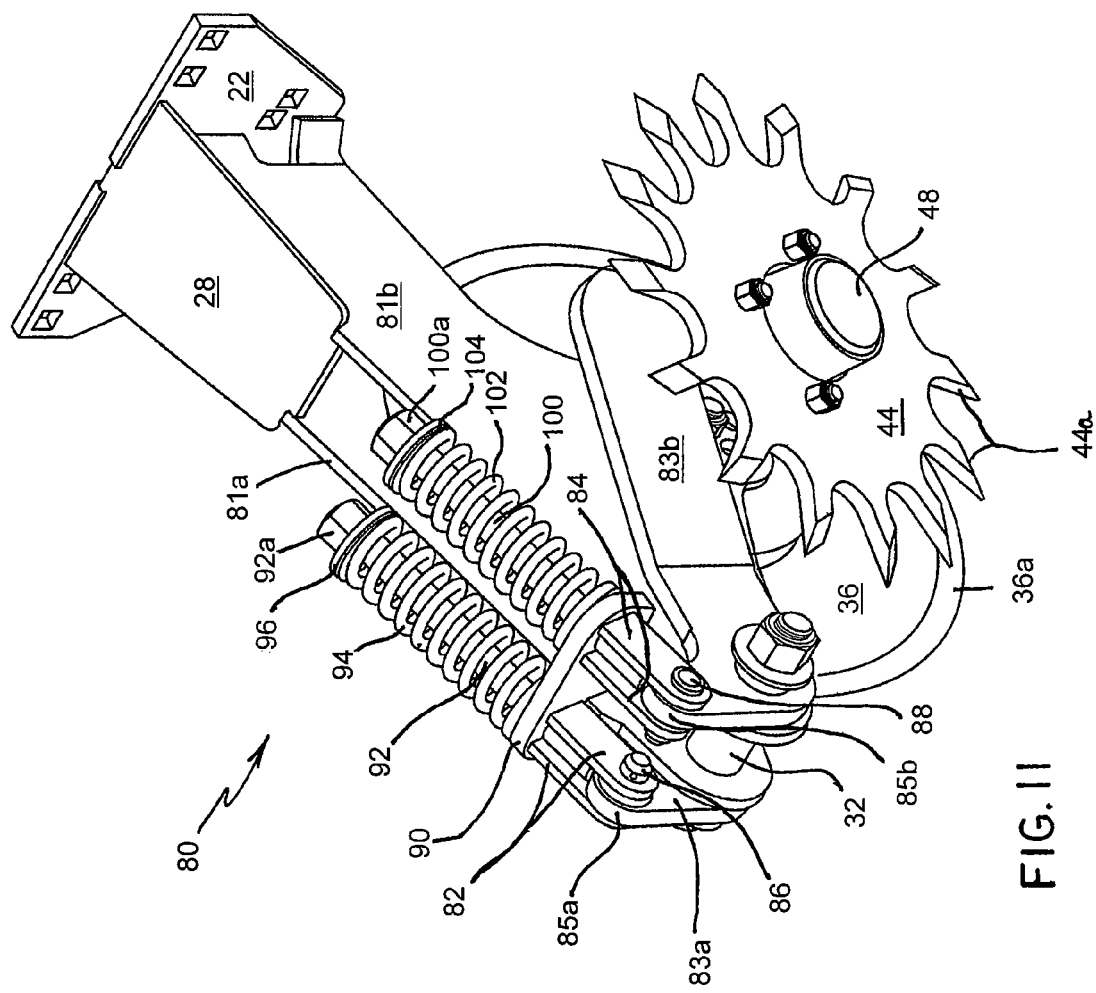
FIG. 11 is an upper perspective view of yet another embodiment of a crop residue clearing device in accordance with the present invention providing a downward or upward biasing force on the soil engaging members.

The crop residue clearing device 80 shown in FIG. 11 is another embodiment of the present invention capable of applying a biasing force on the first and second clearing wheels 42 and 44. The primary difference between the embodiment shown in FIG. 10 and that shown in FIG. 11 is that in the crop residue clearing device 108 shown in FIG. 10 the biasing member, i.e., torsion spring 110, is attached to a pair of upper flanges 34a and 34b on the ends of the first and second support arms 106a, 106b, while in the crop residue clearing device 80 of FIG. 11, the coil compression springs 94, 102 are connected to respective upper flanges 85a, 85b on forward ends of the first and second pivoting arms 83a and 83b. This downward biasing arrangement in crop residue clearing device 80 includes first and second coupling arms 82 and third and fourth coupling arms 84. The first and second coupling arms 82 are connected by means of a first coupling pin 86 to an upper flange 85a of a first pivoting arm 83a. Similarly, the third and fourth coupling arms 84 are coupled by means of a second coupling pin 88 to the upper flange 85b of the second pivoting arm 83b. Attached to adjacent end portions of the first and second coupling arms 82 and the third and fourth coupling arms 84 by conventional means such as weldments is a generally flat mounting plate 90. Mounting plate 90 includes first and second generally circular apertures (not shown for simplicity) therein which are each adapted to respectively receive first and second mounting bolts 92 and 100. A lower portion of mounting plate 90 is securely attached such as by weldments to upper edge portions of first and second support arms 81a, 81b for maintaining the mounting plate in fixed position thereon. Each smooth, unthreaded end portion of each of the first and second mounting bolts 92, 100 is inserted through a respective aperture within the mounting plate 90 and is coupled by conventional means such as weldments to the first and second coupling arms 82 and to the third and fourth coupling arms 84, respectively. Disposed about the first and second mounting bolts 92, 100 are first and second coil compression springs 94 and 102. The lower end of each of the first and second coil compression springs 94, 102 is fixedly attached to the adjacent surface of mounting plate 90 by conventional means such as coupling brackets or weldments which are not shown for simplicity. Disposed in contact with upper ends of the first and second coil compression springs 94, 102 are respective first and second retaining members 96 and 104 which are engaged by and maintained in position by means of the respective compression nuts 92a and 100a which engage respective upper threaded end portions of the first and second bolts 92, 100. Each of the first and second coil compression springs 94, 102 is maintained under compression so as to exert a force on the first and second upper flanges 85a, 85b of the first and second pivoting arms 83a, 83b, respectively. This results in the application of a torsional force on the first and second pivoting arms 83a, 83b about an axis defined by the second lower coupling bolt 32 and increases the downward directed force exerted on the first and second pivoting arms. This torsional force urges the aft end portions of first and second pivoting arms 83a, 83b in a downward direction so as to increase the engagement of the first and second clearing wheels 42, 44 with the soil. By increasing the compression force applied by the first and second coil compression springs 94, 102, the running depths in the soil of the first and second clearing wheels 42, 44 may be increased. Similarly, by reducing the compression force applied to the first and second coil compression springs 94 and 102 such as by loosening the first and second compression nuts 92a, 100a, these two springs will exert a reduced torsional force on the first and second pivoting arms 83a, 83b about an axis defined by the second lower coupling pin 32. With the compressive force exerted on the two coil compression springs 94, 102 reduced, the torsional force exerted on the first and second pivoting arms 83a, 83b about the axis defined by the second lower coupling pin 32 is also reduced. In this manner, the extent of engagement of the first and second clearing wheels 42, 44 with the soil is reduced as is the running depth of the wheels in the soil during operation. Applying an up and down biasing force on the first and second pivoting arms 83a, 83b would require an additional spring arrangement or a pneumatic, hydraulic or electric system for lowering and raising the first and second pivoting arms 83a, 83b and the first and second clearing wheels 42, 44.

The operating depth of each of the first and second clearing wheels 42, 44 is established by the amount of compression applied to the first and second coil compression springs 94, 102 by the first and second compression nuts 92a, 100a, respectively. Thus, the combination of the first compression nut 92a and the first coil compression spring 94 controls the running depth in the soil of the first clearing wheel 42, while the combination of the second compression nut 100a and second coil compression spring 102 controls the running depth in the soil of the second clearing wheel 44. It is in this manner that the running depths, or the extent of engagement with the soil, of each of the first and second clearing wheels 42, 44 may be independently established prior to or during operation in a field. Upper and lower displacement limits are also provided in the embodiment of the row crop clearing device 80 shown in FIG. 11 as in the previously described embodiment. Mounting plate 90 which is fixedly attached to respective upper edge portions of the first and second support arms 81a, 81b provides a stop for the first and second pivoting arms 83a, 83b in the full up position. Thus, upon raising of the first and second clearing wheels 42, 44, upward pivoting movement of the first and second pivoting arms 83a, 83b will be stopped by their engagement with a lower edge portion of mounting plate 90. Similarly, full downward displacement of the first and second clearing wheels 42, 44 during operation in a field, or during transport, will be limited by engagement of adjacent end portions of the first and second coupling arms 82 and the third and fourth coupling arms 84 with a forward, or leading, surface of the mounting plate 90. This contact between the coupling arms and the mounting plate 90 limits further clockwise rotation of the two pivoting arms, as shown for the case of the second pivoting arm 83b in FIG. 11. Finally, the compression applied to the first and second coil compression springs 94, 102 and the extent of downward force applied to the first and second clearing wheels 42, 44 increases with the extent of displacement of the wheels from their pre-set running depth in the soil.

Figure 12:
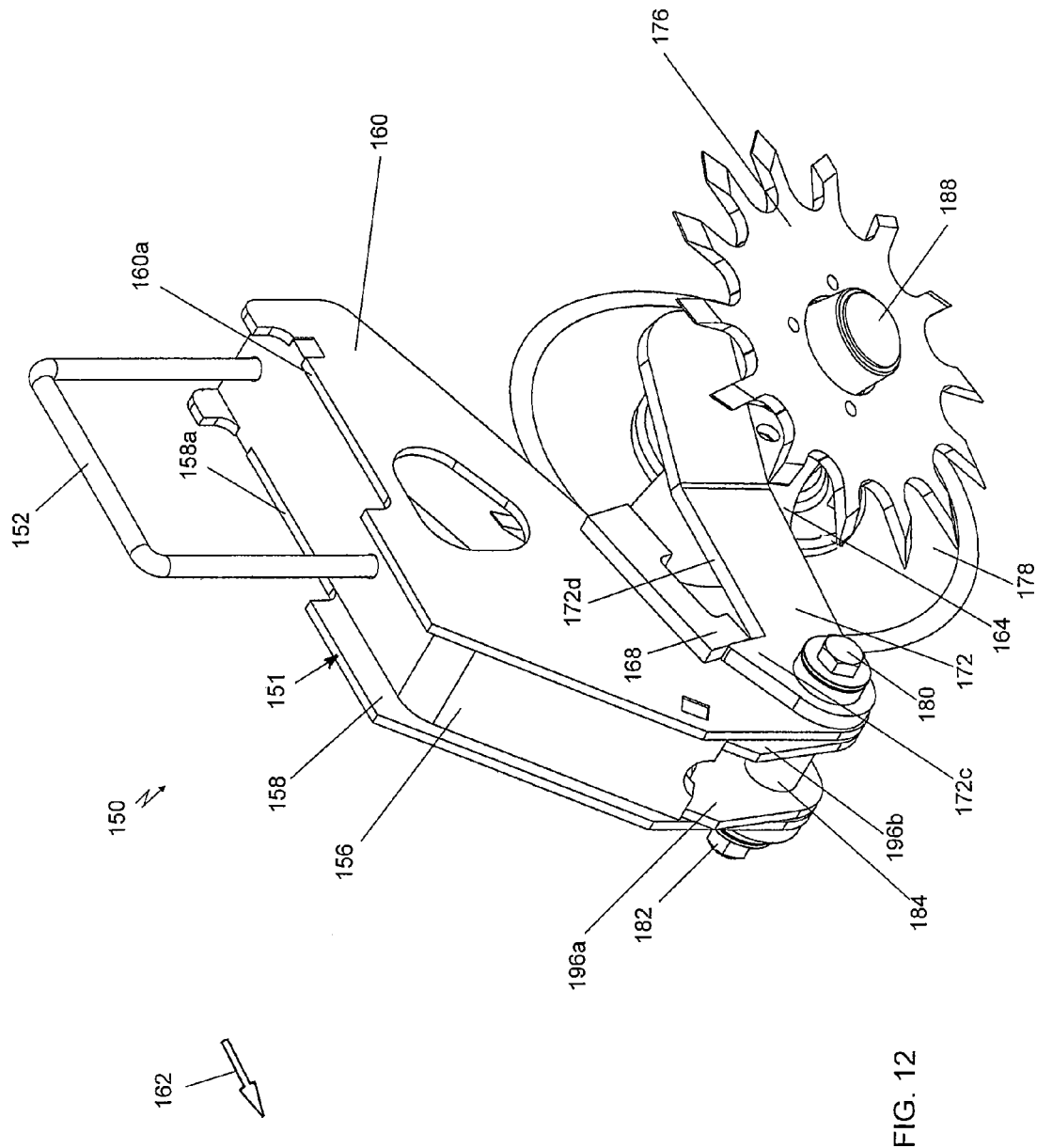
FIG. 12 is an upper perspective view of the embodiment of the inventive crop residue clearing device shown in FIGS. 3 and 4.
Figure 13:
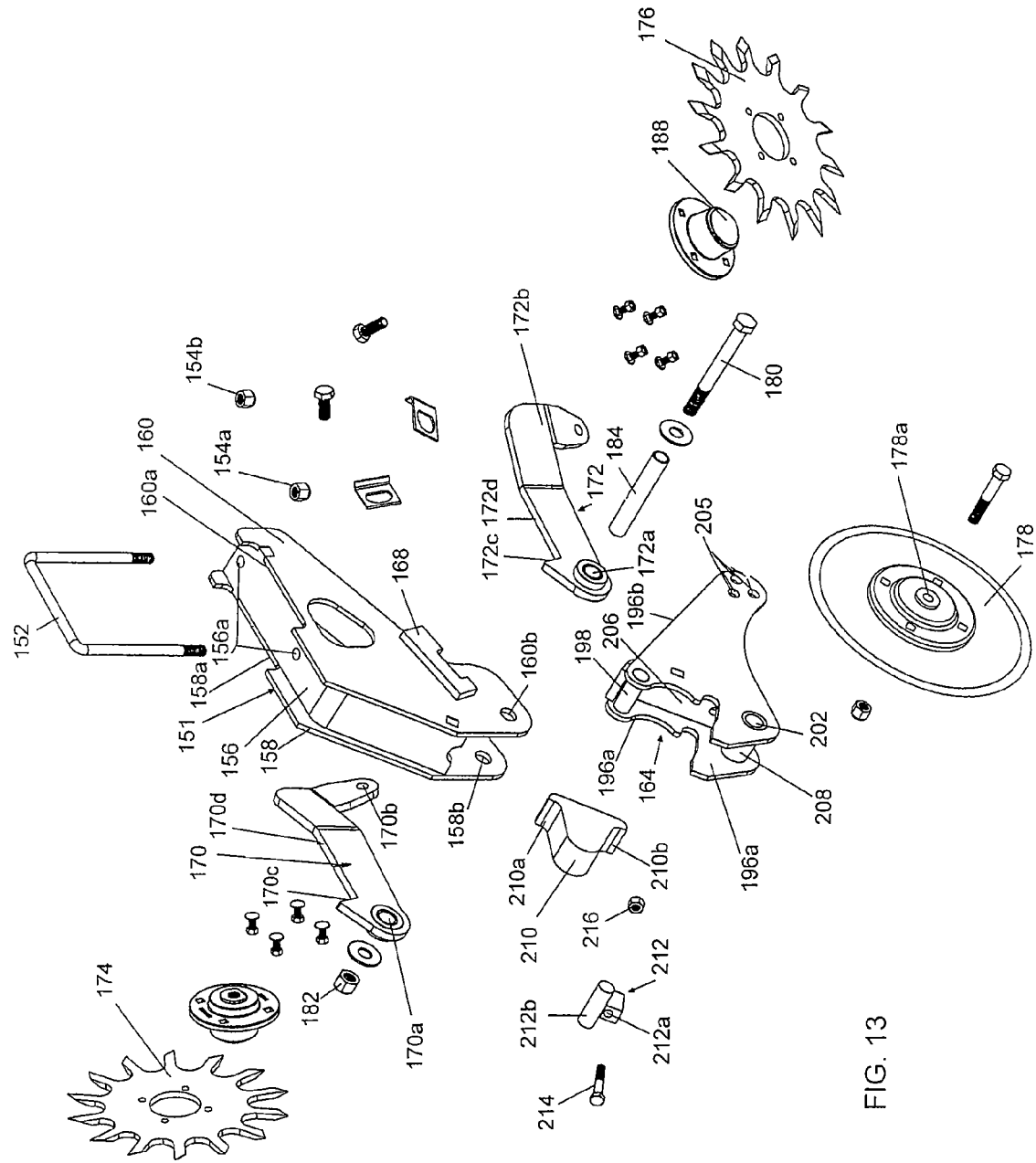
FIG. 13 is an exploded upper perspective view of the crop residue clearing device shown in FIG. 12.
Figure 14:
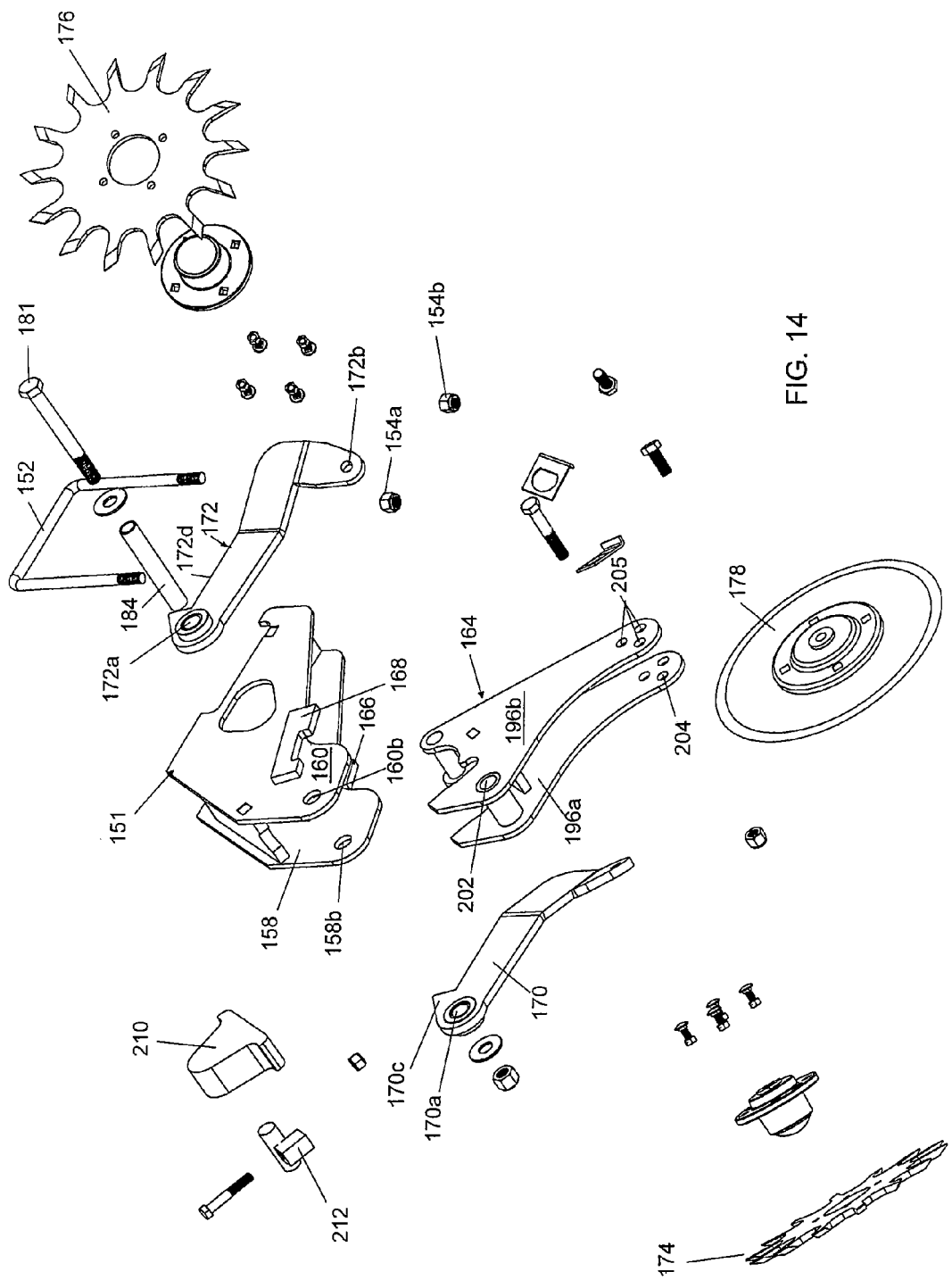
FIG. 14 is an exploded lower perspective view of the crop residue clearing device shown in FIG. 12.
Figure 15:
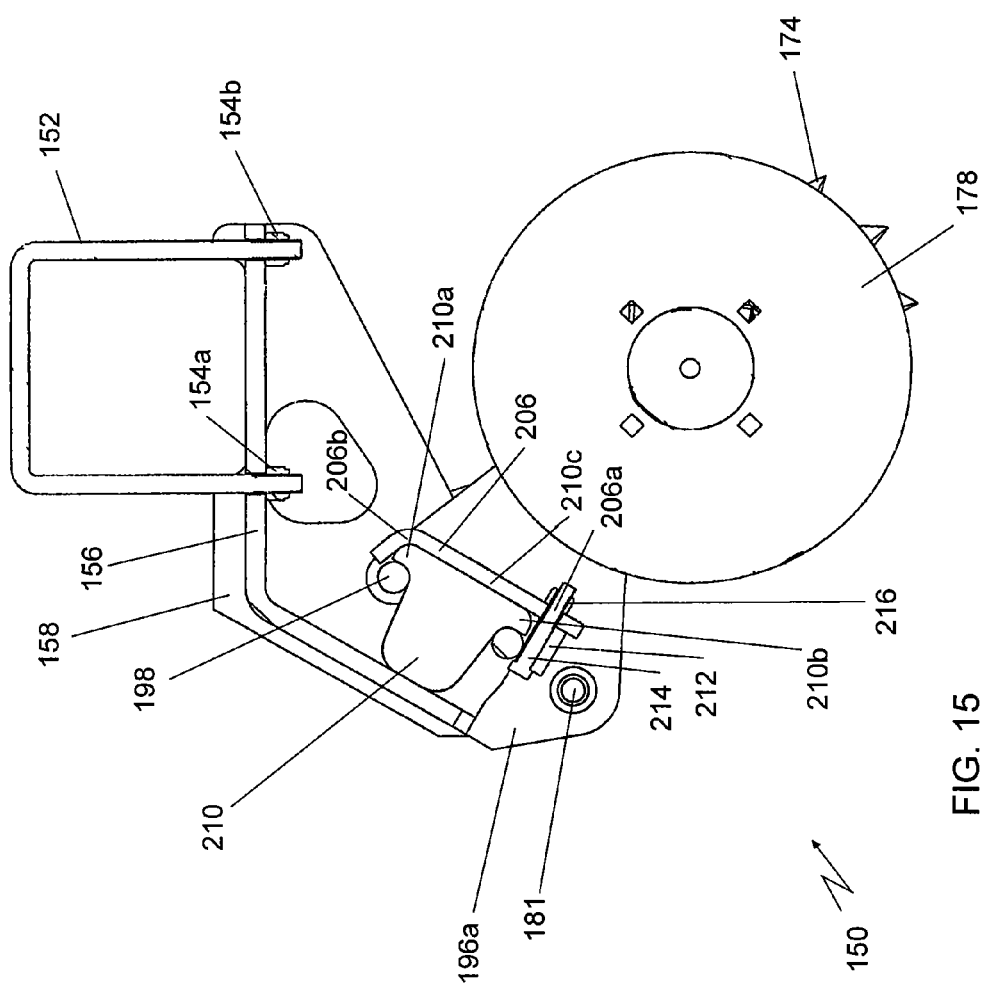
FIG. 15 is a vertical cross sectional view of the crop residue clearing device shown in FIG. 12.

Referring to FIGS. 12-15, there are shown various views of another embodiment of a crop residue clearing device 150 in accordance with the present invention. FIGS. 12 and 13 are respectively an upper perspective view and an upper exploded perspective view of the inventive crop residue clearing device 150. FIG. 14 is a lower exploded perspective view of the inventive crop residue clearing device 150, while FIG. 15 is a vertical cross sectional view of the crop residue clearing device.

Crop residue clearing device 150 includes a housing 151 comprised of a first right side plate 158, a second left side plate 160 and an upper inner plate 156 connected to the two side plates by conventional means such as by weldments. Upper inner plate 156 includes an upper portion connected to respective upper portions of the first and second side plates 158, 160, and an angled forward portion coupled to facing adjacent forward portions of the two side plates. Inserted through a pair of apertures 156a in the upper portion of the upper inner plate 156 is a C-clamp 152 which is securely attached to housing 151 by means of first and second nuts 154a and 154b. C-clamp 152 is adapted for engagement with a tool bar (not shown) of an agricultural implement for securely attaching the crop residue clearing device 150 to the agricultural implement. Respective upper portions of the first and second side plates 158, 160 include recessed portions 158a and 160a which are adapted to receive a lower portion of the tool bar to which crop residue clearing device 150 is mounted.

Disposed in the lower, front portions of the first and second side plates 158, 160 are respective apertures 158b and 160b. Apertures 158b, 160b are used for attaching the forward portion of a pivoting arm assembly 164 to a forward, lower portion of housing 151. Pivoting arm assembly 164 includes third and fourth side plates 196a and 196b connected together in a spaced manner by means of a mounting arm 198 and a first sleeve 208. Sleeve 208 is positioned in alignment with a pair of apertures within forward, lower portions of the third and fourth side plates 196a, 196b, where the lower, forward aperture in the fourth side plate is identified as element 202. With the lower front apertures of the pivot arm assembly 164 and its first sleeve 208 positioned in alignment with the apertures 158b and 160b disposed in the lower, forward portion of housing 151, the combination of a second outer sleeve 184 and pivot pin 180 is inserted through the aforementioned aligned apertures and the first outer sleeve to pivotally connect the pivoting arm assembly 164 and housing 151. Pivot pin 180 is securely maintained in this position by means of a nut 182 secured to its threaded end. The combination of the second sleeve 184 and pivot pin 180 is also inserted through aligned apertures 170a and 172a in respective first and second pivot arms 170 and 172. In this manner, the pivoting arm assembly 164 and the first and second pivoting arms 170, 172 are securely coupled in a pivoting manner to the lower, forward portion of housing 151.

Disposed on lower, aft end portions of the first and second pivoting arms 170, 172 are respective apertures 170b and 172b. Each of apertures 170b, 172b is adapted to receive the respective axle of a toothed wheel 174 and 176, where the axle of wheel 176 is identified as element 188. Each of the toothed wheels 174 and 176 is securely attached to an aft, lower portion of the first and second pivoting arms 170, 172 in a manner which allows the wheels to freely rotate. In addition, the aft ends of the first and second pivoting arms 170, 172 and the toothed wheels 174, 176 respectively attached thereto freely undergo vertical displacement as the ground engaging toothed wheels engage and traverse a field.

Upper and lower limits are placed on the vertical pivoting of the first and second pivoting arms 170, 172 and the vertical displacement of their associated first and second toothed wheels 174 and 176. To limit the uppermost displacement of the first and second pivoting arms 170, 172, there are securely attached to respective outer portions of the first and second side plates 158 and 160 first and second position limiting bars 166 and 168. Thus, as shown for the case of the second pivoting arm 172 in FIG. 12, full upward displacement of this pivoting arm and its associated ground engaging toothed wheel 176 is limited by contact between the second position limiting bar 168 and the upper edge portion 172d of the second pivoting arm. Similar engagement between the upper edge portion 170d of the first pivoting arm 170 and the first position limiting bar 166 is provided on the other side of the crop residue clearing device 150, although this is not shown in the figures for simplicity. Disposed on respective upper, forward portions of the first and second pivoting arms 170, 172 are respective upper extensions 170c and 172c. When the first and second pivoting arms 170, 172 are in the full down position, the respective upper extensions 170c, 172c of these arms engage forward edge portions of the first and second position limiting bars 166 and 168. Thus, with reference to FIG. 12, if the second pivoting arm 172 assumes its lowest position, its upper extension portion 172c will engage a leading edge portion of the second position limiting bar 168 and prevent further downward displacement of the second pivoting arm and its associated toothed wheel 176. A similar arrangement is provided between the upper extension 170c of the first pivoting arm 170 and the first lower position limiting bar 166.

An aft end portion of the third side plate 196a of the pivoting arm assembly 164 is provided with first plural apertures 204. Similarly, an aft end portion of the fourth side plate 196b of the pivoting arm assembly 164 is provided with second plural apertures 205. A pair of aligned apertures in the first plural apertures 204 and the second plural apertures 205 is adapted to receive a pivot pin (not shown for simplicity) for rotationally attaching a coulter 178 to an aft portion of the pivoting arm assembly 164. Coulter 178 is freely rotatable and is free to move vertically because of the pivot pin 180 connection between the crop residue clearing device's housing 151 and its pivoting arm assembly 164.

Inserted in a forward portion of pivoting arm assembly 164 is a cushion member 210. Cushion member 210 is preferably comprised of a compressible, resilient material such as urethane and includes first and second retaining ends 210a and 210b. Extending between the cushion member's first and second retaining ends 210a, 210b is a generally flat aft portion 210c. Flat portion 210c is adapted for positioning upon a retaining member 206. Retaining member 206 includes a lower aperture 206a and an upper curved portion 206b. Retaining member 206 is maintained in fixed position within the crop residue clearing device 150 by means of an insert 212 having an aperture 212a and a cylindrical upper portion 212b. Insert 212 is adapted for secure coupling to retaining member 206 by means of a bolt 214 inserted through the insert's aperture 212a and the retaining member's aperture 206a, with the bolt securely maintained in position by a nut 216. Cushion member 210 is securely maintained in position within the crop residue clearing device 150 by its aft portion 210c in contact with retaining member 206 and its first and second retaining ends 210a, 210b respectively engaged by pivoting arm assembly's mounting arm 198 and the cylindrical portion 212b of insert 212 as shown in the sectional view of FIG. 15.

Upward and downward displacement of coulter 178 is dampened and limited by means of cushion member 210. More specifically, with upward displacement of coulter 178 caused by traversing an upraised portion of the soil, the pivoting arm assembly 164 and coulter combination will be rotated counter clockwise as viewed in FIG. 15 causing downward displacement of mounting arm 198 by the upper curved portion 206b of retaining member 206 with which it is in contact and compression of cushion member 210 from above. Cushion member 210 provides resistance to further upward displacement of coulter 178 until its compressibility limit is reached. Similarly, downward displacement of coulter 178 such as during transit or when traversing a low area in a field will result in a compressive force being applied upwardly on cushion member 210 by the cylindrical portion 212b of insert 212. The resilient compressibility of insert 212 will resist further downward displacement of coulter 170 and establish a lower limit for its vertical displacement range. In this manner, cushion member 210 provides upper and lower limits to the vertical displacement of coulter 178, while also increasing resistance to further vertical displacement of the coulter as it moves away from its equilibrium position.

Referring to FIG. 16, there is shown a perspective view of another embodiment of a pivoting arm 296 for use in the present invention. Pivoting arm 296 includes a forward portion 296a (relative to the direction of travel of the crop residue clearing device during operation in a field), an intermediate portion 296b, and an aft portion 296c. As in the previous described embodiment, pivoting arm 296 includes a first upper aperture 298 disposed in an upper flange 306 of the pivoting arm and a second lower aperture 300 also disposed in the forward portion 296a of the pivoting arm 296. The first upper and second lower apertures 298, 300 are adapted to receive respective coupling pins, or bolts, as previously described. Pivoting arm 296 further includes a third aperture 302 disposed in its aft portion 296c. The first, second and third apertures 298, 300 and 302 are all circular. However, the third aperture 302 includes a notch 304 extending the length of the aperture from one surface of the pivoting arm to its other, opposing surface. Notch 304 is adapted to receive in tight-fitting engagement a complementary projection on an axle, or mounting shaft, of a toothed wheel attached to pivoting arm 296. This complementary mounting arrangement prevents rotation of an axle attached to a ground engaging clearing wheel (not shown), where the axle includes a projection thereon which is adapted for insertion in the notch 304 in the third aperture 304 of pivoting arm 296. Individual manufacturers/distributors of toothed wheels frequently include an axle having a unique configuration so as to identify the source of that particular axle and to require a compatible receiving aperture for mounting the toothed wheel. This embodiment of the present invention also contemplates uniquely configuring the inventive crop residue clearing device, and its components, in accordance with the unique configurations incorporated in components of the device available from various manufacturers/sources.

FIG. 17 is a perspective view of a D-clip 310 in accordance with another embodiment of the present invention. D-clip 310 is designed to facilitate attachment of a toothed wheel to a pivoting arm such as the pivoting arm 296 shown in FIG. 16. D-clip 310 includes a generally flat portion 310a and an angled portion 310b. The flat and angled portions 310a, 310b of D-clip 310 are integrally formed as a single-unit, and the angled portion is oriented at generally a right angle to the D-clip's flat portion 310a. Flat portion 310a is adapted for positioning in contact with the flat surface containing the aperture in which the toothed wheel's axle is inserted. Angled portion 310b is adapted for engaging a side of the pivoting arm so as to prevent rotation of the D-clip 310 when a bolt (not shown) attached to the axle is tightened during axle and wheel installation. D-clip 310 includes an aperture 312 having a generally circular portion 312a and a flat, or linear, portion 312b. Aperture 312 is configured so as to receive an axle in the form of a D-bolt (not shown for simplicity) used in attaching a toothed wheel to a pivoting arm. The shape of the aperture 312 prevents rotation of the D-bolt, or axle, while tightening an attached nut on the D-bolt.

Referring to FIG. 18, there is shown another embodiment of a D-clip 316 having a flat portion 316a and an angled portion 316b. D-clip 316 also includes an aperture 318 having a generally circular portion 318a and a flat, or linear, portion 318b. Aperture 318 in FIG. 18 is larger than aperture 312 in FIG. 17 to allow these types of D-clips to accommodate a range of sizes of mounting bolts, or axles, for attaching a toothed wheel to a pivoting arm in the inventive crop residue clearing device.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An arrangement for clearing crop residue from a field traversed by an agricultural planter, said planter having at least one planter unit coupled to a tool bar by a linkage that allows vertical displacement between the tool bar and the planter unit, said arrangement comprising:
a rigid support structure having a first forward portion disposed in the direction of travel of the planter during operation and a second opposed aft portion;
a first mounting structure fixedly attaching the second aft portion of said support structure directly to the planter unit,
a crop residue clearing device engaging the soil; and
a second mounting structure attaching said crop residue clearing device to the first forward portion of said support structure for pulling said crop residue clearing device through the field.

2. The arrangement of claim 1, wherein said second mounting structure attaches said crop residue clearing device to the first forward portion of said support structure in a vertically movable manner.

3. The arrangement of claim 1 further comprising a pivoting coupler connecting said crop residue clearing device to the first forward portion of said support structure for allowing said crop residue clearing device to move up and down in a generally vertical direction relative to said planter unit.

4. The arrangement of claim 3 further comprising a compression mechanism coupled to said second mounting structure for urging said crop residue clearing device in a downward direction to increase engagement with the soil.

5. The arrangement of claim 4, wherein said compression mechanism is coupled between said support structure and said second mounting structure for urging said crop residue clearing device downwardly to increase engagement with the soil.

6. The arrangement of claim 4, wherein said crop residue clearing device includes first and second crop residue clearing members, and wherein said compression mechanism independently urges said first and second crop residue clearing members downwardly into engagement with the field.

7. The arrangement of claim 6, wherein said arrangement further includes first and second mounting members for coupling said first and second crop residue clearing members, respectively, to the first forward portion of said support structure.

8. The arrangement of claim 7, wherein said compression mechanism is coupled to said first and second mounting members for urging said first and second crop residue clearing members in a downward direction to increase engagement with the soil.

9. The arrangement of claim 8, wherein said compression mechanism urges said first and second crop residue clearing members in a downward direction in unison and to the same extent.

10. The arrangement of claim 8, wherein said compression mechanism urges said first and second crop residue clearing members in a downward direction independently.

11. The arrangement of claim 7, wherein said first and second mounting members are respective first and second arms pivotally coupled to said support structure.

12. The arrangement of claim 11, wherein said first and second pivot arms are angled outwardly away from said support structure in proceeding rearwardly toward the aft portion of said support structure so as to provide said first and second crop residue clearing members with respective inwardly directed forward portions.

13. The arrangement of said claim 12, wherein said crop residue clearing members include first and second toothed wheels rotationally attached to respective aft portions of said first and second pivot arms.

14. The arrangement of claim 4, wherein said compression mechanism includes a hydraulic system, a pneumatic system, an electric system or a mechanical system.

15. The arrangement of claim 14, wherein said compression mechanism comprises a mechanical system that includes one or more springs.

16. The arrangement of claim 4, wherein the compression applied to said crop residue clearing device increases with increasing displacement of the crop residue clearing device from a preset running depth in the soil.

17. The arrangement of claim 4, wherein said compression mechanism includes a coil compression sprint.

18. The arrangement of claim 17, wherein said coil compression spring is coupled to said second mounting structure by a mounting bolt and nut combination.

19. The arrangement of claim 18 further comprising a pivoting connection arrangement for coupling said compression spring and bolt and nut combination to said second mounting structure.

20. The arrangement of claim 19 further comprising a mounting plate for coupling said compression spring and bolt and nut combination to said second mounting structure.

21. The arrangement of claim 4, wherein said compression mechanism includes a torsion spring coupled between said support structure and said second mounting structure for urging said crop residue clearing device in a downward direction.

22. The arrangement of claim 1, wherein said crop residue clearing device includes at least one wheel having plural teeth extending outwardly from the periphery thereof.

23. The arrangement of claim 1 further comprising a residue cutting and soil penetration device attached to said support structure adjacent said crop residue clearing device.

24. The arrangement of claim 23, wherein said residue cutting and soil penetration device is disposed forward of said crop residue clearing device in the direction of travel of the apparatus during operation.

25. The arrangement of claim 24, wherein said crop residue clearing device and said residue cutting and soil penetration device are disposed forward of said planter unit in the direction of travel of the apparatus during operation.

26. The arrangement of claim 24, wherein said crop residue clearing device includes at least one wheel and said residue cutting and soil penetration device includes a coulter.

27. The arrangement of claim 26, wherein said at least one wheel includes plural spaced teeth disposed about the outer periphery thereof.

28. The arrangement of claim 26, wherein said coulter has a tapered outer peripheral edge portion.

29. The arrangement of claim 23, wherein said crop residue clearing device includes first and second laterally spaced crop residue clearing members.

30. The arrangement of claim 29, wherein said residue cutting and soil penetration device is disposed intermediate said first and second laterally spaced crop residue clearing members.

31. The arrangement of claim 23, wherein said crop residue clearing device includes first and second crop residue clearing members, and wherein each of first and second crop residue clearing members includes a respective wheel and said residue cutting and soil penetration device includes a coulter.

32. The arrangement of claim 31, wherein each of said first and second crop residue clearing wheels includes respective plural spaced teeth disposed about the outer periphery thereof.

33. The arrangement of claim 1 further comprising a stop arrangement for limiting vertical movement of said crop residue clearing device.

34. The arrangement of claim 33, wherein said crop residue clearing device includes first and second laterally spaced crop residue clearing members.

35. The arrangement of claim 34, further comprising first and second stop members for respectively limiting the lowest positions of said first and second crop residue clearing members, respectively.

36. The arrangement of claim 35, wherein said first and second stop members engage said second mounting structure in limiting the lowest positions of said first and second crop residue clearing members.

37. The arrangement of claim 35, wherein said first and second stop members are attached to said support structure.

38. The arrangement of claim 34 further comprising a compression mechanism for engaging and urging said crop residue clearing members in a downward direction.

39. The arrangement of claim 38, wherein said compression mechanism urges said crop residue clearing members downward into engagement with the field.

40. The arrangement of claim 39, wherein a downward force exerted by said compression mechanism on said crop residue clearing device is variable.

41. The arrangement of claim 40, wherein a downward force exerted by said compression mechanism on said crop residue clearing device increases as the extent of engagement of said crop residue clearing device with the soil increases.

42. The arrangement of claim 39, wherein downward force exerted by said compression mechanism on said crop residue clearing device is adjustable in magnitude.

43. The arrangement of claim 33, wherein said crop residue clearing device includes first and second crop residue clearing members, and wherein said compression mechanism independently urges said first and second crop residue members in a downward direction.

44. The arrangement of claim 43, wherein downward forces exerted by said compression mechanism on said first and second crop residue clearing members are variable and independently adjustable.

45. The arrangement of claim 1, wherein said planter unit includes a front mounting area, and wherein said arrangement is fixedly attached to said front mounting area.

46. The arrangement according to claim 1, wherein said planter unit is coupled to said tool bar by a parallel linkage.

47. A crop residue clearing arrangement attached to an agricultural planter, said planter having at least one planter unit coupled to a tool bar by a linkage that allows vertical displacement between the tool bar and the planter unit, said crop residue clearing arrangement comprising:
 a rigid support structure having a forward portion and an aft portion, wherein said forward portion is disposed in the direction of travel of the agricultural planter during use in a field and said aft portion is directly attached to said planter unit in a fixed manner, and said support structure extends forward of the planter unit;
 at least one pivoting arm attached to the forward portion of said support structure and having at least one rotatable soil engaging wheel attached thereto for reducing and clearing crop residue, wherein said at least one pivoting arm and said at least one rotatable wheel are pulled by said support structure through a field;
 a stop arrangement attached to said support structure for limiting the uppermost and lowest positions of said at least one soil engaging wheel; and
 a biasing structure for urging said at least one pivoting arm downward for increasing the extent of engagement of said at least one rotatable wheel with the soil and wherein the extent of engagement may be reduced by reducing the extent of downward urging by said biasing structure.

48. Apparatus for clearing crop residue from a field traversed by an agricultural planter, said planter having at least one planter unit coupled to a tool bar by a linkage that allows vertical displacement between the tool bar and the planter unit, said apparatus comprising:
 a rigid housing;
 a coupling arrangement for fixedly attaching said housing directly to the planter unit such that at least a forward portion of said housing extends forward of the planter unit to which said housing is attached;
 a first crop residue clearing device;
 a first pivoting coupler attaching said first crop residue clearing device to said housing such that said first crop residue clearing device is pulled through a field by the planter unit and is adapted for vertical displacement relative to the planter unit in traversing irregularities in the field.

49. The apparatus of claim 48 further comprising a coulter suspended from said housing and extending forward of said crop residue clearing device.

50. The apparatus of claim 48 further comprising a second pivoting coupler attaching said coulter to the forward portion of said housing such that said coulter is adapted for vertical displacement in traversing irregularities in the field.

51. The apparatus of claim 50, wherein said first and second pivoting couplers have a common axis of rotation and a common pivot pin.

52. The apparatus of claim 51 further comprising a first arm coupling said coulter to said second pivoting coupler.

53. The apparatus of claim 52 further comprising a resilient compression member engaging said first arm for limiting the uppermost and lowest positions of said coulter.

54. The apparatus of claim 53, wherein said resilient compression member is comprised of urethane.

55. The apparatus of claim 54, wherein the forward portion of said housing and a forward portion of said first arm each include at least one respective aperture, wherein said at least one aperture of said housing and said at least one aperture of said first arm are aligned so as to receive said pivot pin in coupling said first arm to said housing.

56. The apparatus of claim 53, wherein said resilient compression member increases a resistance to further vertical displacement of the coulter as the distance of the coulter from an equilibrium position increases.

57. The apparatus of claim 52 further comprising a second crop residue clearing device and a third pivoting coupling connecting said second crop residue clearing device to said housing, and wherein said second crop residue clearing device is adapted for vertical displacement relative to said planter unit in traversing irregularities in the field.

58. The apparatus of claim 57 further comprising first and second stop arrangements for limiting the uppermost and lowest positions of said first and second crop residue clearing devices, respectively.

59. The apparatus of claim 58, wherein said first and third pivoting couplings respectively include second and third pivoting arms respectively coupling said first and second crop residue clearing devices to said housing.

60. The apparatus of claim 59, wherein said first and second stop arrangements respectively engage said second and third pivoting arms in limiting the uppermost and lowest positions of said first and second crop residue clearing devices.

61. The apparatus of claim 60, wherein said first and second stop arrangements respectively include first and second structural members fixedly attached to said housing and adapted for engaging said second and third pivoting arms.

62. The apparatus of claim 61, wherein said first and second crop residue clearing devices include respective first and second wheels rotationally attached to respective distal ends of said second and third pivoting arms.

63. The apparatus of claim 62, wherein each of said first and second wheels includes plural spaced teeth extending outwardly from their respective peripheries thereof.

64. The apparatus of claim 63, wherein aft portions of each of said second and third pivoting arms extend outwardly away from said housing in an angled manner in proceeding rearwardly toward an aft portion of said housing.

65. The apparatus of claim 64, further comprising first and second biasing arrangements for urging said first and second wheels downwardly for increased engagement with the soil.

66. The apparatus of claim 65, wherein said first and second biasing arrangements urge said first and second wheels downwardly into increased engagement with the soil in an independent manner.

67. The apparatus of claim 48, wherein said coupling arrangement is adapted for coupling said housing to the planter unit.

68. The apparatus of claim 48, wherein said planter unit is coupled to said tool bar by a parallel linkage.

69. For use with an agricultural implement including a planter for depositing seeds along a seeding pathway, said planter having at least one planter unit coupled to a tool bar by a linkage that allows vertical displacement between the tool bar and the planter unit, apparatus for removing crop debris from the seeding pathway comprising:
 a rigid support structure having a first forward portion disposed in the direction of travel of the planter during operation and a second opposed aft portion;
 a first connecting structure fixedly attaching the second aft portion of said support structure directly to a forward portion of the planter unit;
 a crop residue clearing device engaging the soil and positioned in alignment with the seeding pathway; and
 a second connecting structure pivotally attaching the forward portion of said support structure to said crop residue clearing device for pulling said crop residue clearing device through a field, wherein said crop residue clearing device reduces the size of the crop debris and discharges the reduced crop debris away from the seeding pathway.

70. The apparatus of claim 69, wherein said crop residue clearing device comprises a pivoting arm attached to said support structure and an axle of a ground engaging wheel attached to an aft end of said pivoting arm.

71. The apparatus of claim 70, wherein said axle is generally circular in cross section and includes a projection extending over a portion of the length of said axle and said pivoting arm includes a generally cylindrical opening adapted to receive said axle and including an elongated recessed portion adapted to receive the projection on said axle in a tight fitting manner.

72. The apparatus of claim 69, wherein said crop residue clearing device includes at least one coupling assembly including first and second rotationally connected members, and wherein said apparatus further includes a structural member adapted for engaging said first member and contacting a portion of said crop residue clearing device in a fixed manner to prevent rotation of said first member when said second member is rotated during connection or disconnection of the first and second members.

73. The apparatus of claim 72, wherein said structural member includes a first portion for receiving said first or second member and a second portion for contacting a portion of said crop residue clearing device in a fixed manner.

74. The apparatus of claim 73, wherein said first portion includes an aperture for receiving and fixedly engaging said first or second member and preventing the rotation thereof during rotation of the other member.

75. The apparatus of claim 74, wherein said first and second portions of said structural member are each generally flat and are aligned generally transverse to one another.

76. The apparatus of claim 75, wherein said first and second portions form a generally unitary structure.

77. The apparatus of claim 76, wherein said first member is an axle having threaded ends, said second member is a threaded nut for mating with said threaded ends, and said structural member is a D-clip.

78. The apparatus of claim 69, wherein said planter unit is coupled to said tool bar by a parallel linkage.

* * * * *